Dec. 13, 1966     N. FATICA     3,291,572
HYDROGEN GENERATOR
Filed April 22, 1964
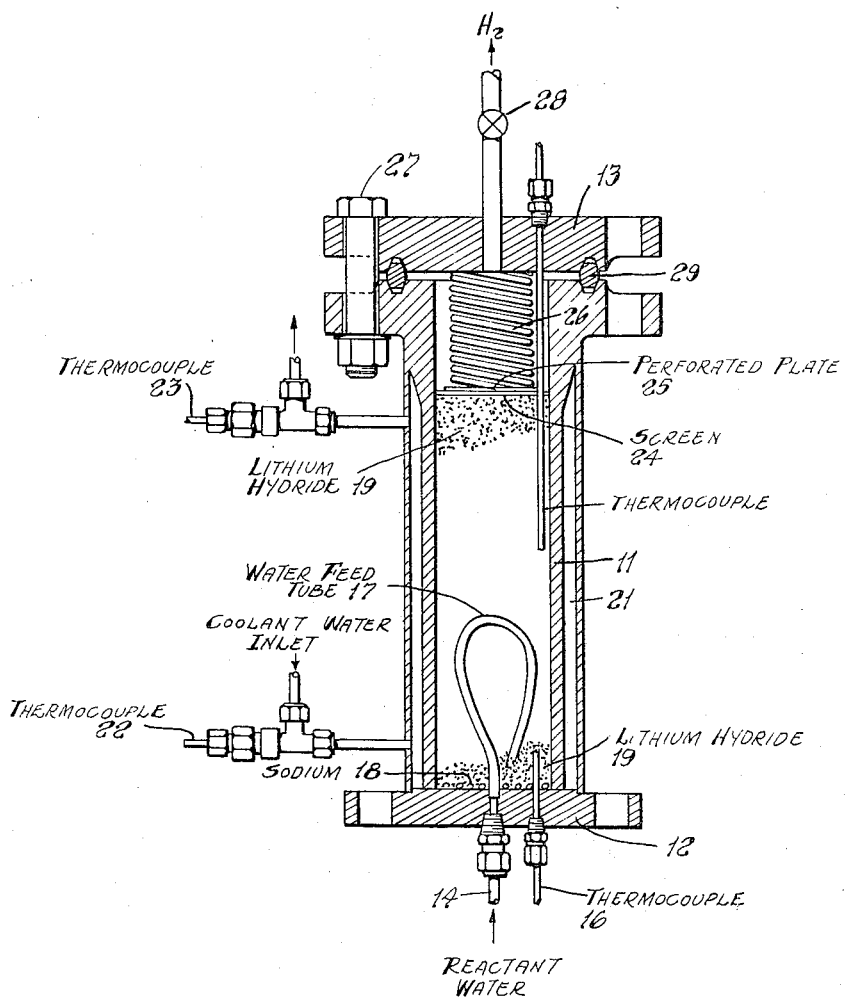
INVENTOR.
NICHOLAS FATICA
BY
ATTORNEY

United States Patent Office 3,291,572
Patented Dec. 13, 1966

3,291,572
HYDROGEN GENERATOR
Nicholas Fatica, Cleveland, Ohio, assignor, by mesne assignments, to the United States of America as represented by the Secretary of the Navy
Filed Apr. 22, 1964, Ser. No. 361,920
2 Claims. (Cl. 23—281)

This invention relates to an improved hydrogen generator for a closed cycle torpedo propulsion system.

The trend in underwater propulsion systems in general and torpedo power plants, in particular, is towards higher speeds, longer range, and ability to operate at any depth without sacrificing performance. One of the best propulsion systems from this point of view involves the use of lithium hydride to generate hydrogen. The hydrogen, in turn, is oxidized with hydrogen peroxide, adding sufficient diluent water to the combustor to keep steam generated at reasonable temperature levels. The steam drives a prime mover and is condensed, and part of it is returned to the hydrogen generator to form more hydrogen.

The improved hydrogen generator of this invention utilizes lithium hydride and water as key components. It differs from other hydrogen generators in that the generating reaction takes place in a relatively narrow zone of the lithium hydride bed at temperatures of the order of 2000° F. Under such conditions, the hydrogen produced is bone-dry and the rate of generation is practically independent of the chemical kinetics normally associated with the heterogeneous-type reactions.

An object of this invention is to provide a hydrogen generator in which the generation rate is controlled by water input.

Another object is to provide a hydrogen generator in which the generating bed is not in the fluidized state.

A further object is to provide a hydrogen generator in which the rate of generation is smoother and greater than normally would be expected and in which steam breakthroughs are negligible.

A still further object is an apparatus in the form of a hydrogen generator of low fabrication and maintenance cost, light weight, high durability and facile in use under a wide variety of service conditions.

Other objects and many of the attendant advantages of this invention will be readily appreciated as the same become better understood by reference to the following detailed description when considered in connection with the accompanying drawings, wherein the figure is an elevational view in section of the hydrogen generator of this invention.

The generator, as shown, comprises a body housing 11 having a cylindrical opening of open end construction provided with end plates 12 and 13. A bottom plate 12 is secured to the lower end of the body housing 11 over the open end appearing therein. The bottom plate 12 is provided with fittings 14 and 16 for the admittance of reactant water, and a thermocouple. The end of the water inlet fitting 14 is provided with a U-shaped tube 17 which directs the flow of the reactant water to the sodium bed 18 which appears at the lower end of the cylindrical opening beneath the bed of lithium hydride 19 which occupies most of the space.

The body housing 11 is provided with a water jacket 21 having inlet and exhaust fittings 22 and 23 for the circulation of coolant around the bed of the reactants. The upper surface of the lithium hydride bed 19 is provided with a screen 24 upon which is superimposed a spring loaded perforated plate 25 whose combined function it is to prevent channeling and to maintain the bed under pressure. The spring 26 is maintained in position by an upper end plate 13 which is secured in position by a series of bolts 27 engaging the exterior of the body housing 11. The end plate 13 is provided with an exhaust fitting and valve 28 which communicates with a pressure transducer and thence to a pressure dump and receiver (not shown).

*Operation.*—To charge the generator, 10 grams of sodium 18 are placed on the bottom of the generator and lithium hydride 19 is poured on top of it to a depth of 10 inches. An 80 mesh screen 24 followed by a perforated plate 25 are placed on top of the lithium hydride bed 19 and a coil spring 26, which is attached to the top flange 13 is used to hold the plate 25 down. After placing the ring-joint gasket 29 and the spring 26 in place, the top flange 13 is bolted to the generator.

To initiate a run, a pump attached to the inlet fitting 14 is started and the inlet valve is opened. When the generator pressure reaches the desired operating pressure, the exhaust valve 28 at the top of the generator is then opened.

Previous experience had shown, that if the reaction between granular lithium hydride and water is initiated with water, it would be sluggish and low evolution rates would be obtained. However, if steam is used to actuate a lithium hydride bed having a particle size between 14 to 60 mesh, the reaction could be started rapidly and then continued even though the steam is switched to cooler water. Therefore, 10 grams of sodium were incorporated into the generator below the lithium hydride bed. In this way, a cold water-metal reaction at the bottom of the bed could be used to generate the steam needed to start the reaction, and liquid water could be used throughout the entire generation period. A U-shaped water feed tube was adapted on the inlet fitting, as shown, so that the water would flow downward into the sodium. With this arrangement, the lag in starting was reduced to the order of one second.

Of primray interest is the control of hydrogen generation rates by a controlled water input. During the operation of the generator, the reactant water is supplied to the generator by means of a positive displacement pump. The total accumulative flow of hydrogen is determined by computing the moles of hydrogen contained in the generator and receiver, using the perfect gas laws. The volume of each container is known and the pressure in each is continuously recorded, thus making the calculation quite simple.

If the generator is utilized without the spring loaded perforated plate being in place upon the lithium hydride bed, the amount of hydrogen produced is considerably less than that expected from water input and poor linearity exists between water input and hydrogen output. This discrepancy in mass balance can be explained by assuming that steam is by-passing the lithium hydride and/or water is accumulating in the reaction zone of the generator. When the 80 mesh screen and spring-loaded plate are placed in position as shown in the drawing, the hydrogen to water ratio obtained is even greater than expected, assuming only lithium hydroxide is formed. However, from previous experience, it becomes evident that some $Li_2O$ must be formed since twice as much hydrogen may be expected from one mole of water if this product is formed.

From previous tests, it also became quite evident that hydrogen generation rates are much smoother with than without spring loading of the lithium hydride bed. Also, spring loading prevented steam breakthroughs. Once steam breakthroughs occur, a constantly decreasing amount of lithium hydride is exposed to steam and the amount of hydrogen produced is considerably less than would be theoretically expected. Further evidence of the prevention of steam breakthroughs with spring loading may be obtained from a study of the hydrogen exit temperature in relation to time. With spring-loading of the lithium hydride bed, the hydrogen temperature remains at a low value until the test is nearly complete, whereas without the spring-loading, the hydrogen temperature begins to rise sharply from the start.

Therefore, while hydrogen generators utilizing lithium hydride have been built before, they were not suitable for the intended application because of their bulk and lack of control of hydrogen generation rates, steam breakthroughs and temperature. Thus, it is evident, from the foregoing, that I have invented an improved apparatus for use as a hydrogen generator in a closed cycle torpedo propulsion system. Obviously, many modifications and variations of the present invention will become apparent to one skilled in the art in view of the above teachings. Each and every one of these variations is apparent in view of the present teaching. It is therefore to be understood that the invention as set forth in the appended claims may be practiced otherwise than as described.

I claim:
1. A hydrogen generator comprising
   a hollow cylindrical housing having a body with an upper and lower open end, said body provided with an interior water jacket having inlet and exhaust fittings;
   a lower end plate secured over said lower open end of said housing;
   a water inlet fitting adapted on said lower end plate for admittance of water into said housing, said water inlet provided with a U-shaped tube within said housing;
   a sodium bed resting on said lower end plate within said housing;
   a lithium hydride bed resting on said sodium bed within said housing;
   an upper plate secured over said upper open end of said housing;
   a hydrogen exhaust fitting adapted on said upper plate for the exhaust of hydrogen from said housing;
   a perforated plate resting in pressing engagement on said lithium hydride bed; and
   a spring means dependent from said upper end plate within said housing, said spring means in pressing engagement with said perforated plate.
2. A hydrogen generator of claim 1 wherein a mesh screen lies intermediate said perforated plate and said lithium hydride bed.

References Cited by the Examiner
FOREIGN PATENTS 14,588 10/1911 France.
21,831 1897 Great Britain.

MORRIS O. WOLK, *Primary Examner.*

JAMES H. TAYMAN, Jr., *Examiner.*